(12) United States Patent
Stetter

(10) Patent No.: US 6,701,776 B2
(45) Date of Patent: Mar. 9, 2004

(54) APPARATUS AND METHOD FOR LEAK DETECTION

(75) Inventor: Joseph R. Stetter, Naperville, IL (US)

(73) Assignee: Illinois Institute of Technology, Chicago, IL (US)

( * ) Notice: Subject to any disclaimer, the term of this patent is extended or adjusted under 35 U.S.C. 154(b) by 0 days.

(21) Appl. No.: 10/194,164

(22) Filed: Jul. 12, 2002

(65) Prior Publication Data

US 2004/0007050 A1 Jan. 15, 2004

(51) Int. Cl.[7] .................................................. G01M 3/04
(52) U.S. Cl. ........................................................ 73/49.2
(58) Field of Search .......................... 73/40, 40.7, 49.2; 324/455; 702/51; 205/784

(56) References Cited

U.S. PATENT DOCUMENTS

| | | |
|---|---|---|
| 3,593,143 A | 7/1971 | Nakahara et al. |
| 4,488,118 A * | 12/1984 | Jeffers et al. ................ 324/455 |
| 4,668,940 A | 5/1987 | Beard et al. |
| 4,852,054 A * | 7/1989 | Mastandrea .................. 702/51 |
| 4,912,471 A | 3/1990 | Tyburski et al. |
| 5,008,661 A | 4/1991 | Raj |
| 5,184,504 A * | 2/1993 | Spring ........................ 73/49.2 |
| 5,187,366 A | 2/1993 | Hopenfeld |
| 5,225,812 A | 7/1993 | Faghri |
| 5,264,368 A | 11/1993 | Clarke et al. |
| 5,347,850 A * | 9/1994 | Tuma ......................... 73/49.2 |
| 6,079,252 A | 6/2000 | Tabler et al. |
| 6,175,784 B1 | 1/2001 | Jicha et al. |
| 6,182,497 B1 | 2/2001 | Krajci |
| 6,252,510 B1 | 6/2001 | Dungan |
| 6,305,215 B2 | 10/2001 | Lehmann |
| 6,488,836 B1 * | 12/2002 | Nakata et al. ............... 205/784 |

* cited by examiner

*Primary Examiner*—Hezron Williams
*Assistant Examiner*—Jay L Politzer
(74) *Attorney, Agent, or Firm*—Pauley Petersen & Erickson

(57) ABSTRACT

A monitoring system for chemical shipments having an apparatus for detection of a leak from a shipment vessel having a shroud. A first chemical sensor is in communication with a chamber of the shroud for detecting the presence of a substance leaking from the vessel. A second sensor is in communication with the ambient environment surrounding the shroud. A monitoring circuit in communication with the first chemical sensor and the second chemical sensor monitors a first chemical sensor output and a second chemical sensor output and signals an information unit dependant on the increase of at least one of the first and second chemical sensors. The information unit emits a signal to an alarm or output device in response to an increase of the magnitude and/or rate of increase of at least one of the first chemical sensor output and the second chemical sensor output. A physical sensor can be in combination with the monitoring circuit. The information unit can be a remote information unit to which the monitoring circuit signals by wireless communication means.

31 Claims, 2 Drawing Sheets

APPARATUS AND METHOD FOR LEAK DETECTION

FIELD OF THE INVENTION

This invention relates to a leak detection apparatus and method for detecting leaks from a high-pressure or low pressure vessel used to transport and/or store a substance.

BACKGROUND OF THE INVENTION

Hazardous and flammable substances are often stored and transported in high-pressure vessels or other types of sealed vessels, such as railroad tankcars, semi-tractor trailer tanks, or other vehicles capable of hauling or holding a high-pressure vessel. Often these vessels can develop leaks around the valves and/or other access means used to fill, empty, and/or otherwise access the vessel, and/or pressure relief valves, due to neglect, environmental factors, or even normal use. Intermittent, temporary leaking can also occur during transport due to slamming of a manway lid of the vessel, rough road or rail conditions, and/or the impact of the vessel during humping of the railcars or hitching the semi-tractor trailer.

Leaking can be expensive to the shipments owner and dangerous to those working near the vessel. Current commercial leak monitoring systems are brought to the vessel to detect leaks and are used when the vessel is stationary, including during loading, unloading, and maintenance conditions. There is a need for a leak detection apparatus useful for detecting leaks of a vessel, such as a railroad tankcar, while in motion or while stationary. There is a need for a detection apparatus that can monitor shipments while the vessel is in motion or stationary and to transmit the detected information to a remote unit. There is a need for a system of detection apparatuses that can monitor information on a plurality of shipment vessels while stationary or in motion and transmit that information through wireless means to a central monitoring unit.

SUMMARY OF THE INVENTION

It is one object of this invention to provide a system of chemical sensors used to detect leaks of hazardous or flammable substances from vessels during transit, docking, and storage.

It is another object of this invention to provide a leak detection apparatus to protect the health and safety of workers and the environment.

It is another object of this invention to provide a system for monitoring safety, security, and inventory management of a shipment for shippers, operators, customers, or others involved in the mobile shipment of chemicals and hazardous materials.

It is another object of this invention to use at least one chemical sensor and/or other sensor type in combination with wireless technologies, such as a cell phone, a pager, wireless Internet, and/or other satellite technology, and/or Internet technology to transmit the status of a shipment, both while the shipment vessel is in motion and stationary, to a user designated site or a central site. The central site can distribute the status information via dedicated line or via a means such as the Internet, a pager, a cell phone, and/or other electrical or digital communication devices to persons having an interest in the shipment information.

The above objectives are accomplished, in one embodiment of this invention, by a leak detection apparatus having a first chemical sensor in communication with a first chamber of a shroud of a vessel and a second chemical sensor in communication with an ambient environment surrounding the shroud. Upon exposure to a predetermined substance, the first and second chemical sensors have a first and second chemical sensor output, respectively. A monitoring circuit can monitor the first chemical sensor output and the second chemical sensor output and detect a first increase of the first chemical sensor output and/or a second increase of the second chemical sensor output. The monitoring circuit signals an information unit in communication with the monitoring circuit. The signal can depend on the first increase and/or the second increase. The signal can also depend on no increase in the first and second chemical sensor outputs, thereby signaling favorable conditions. By comparing the first and second chemical outputs, the leak detection apparatus of this invention can be used effectively while the vessel is in motion. Also, the use of two sensor signals can reduce interference and false alarms because physical and chemical interferences like rapid temperature changes or high pollution levels can be determined by use of the second sensor.

In one embodiment, the shroud provides a barrier between the first and second chemical sensors resulting in detectable differences between the first and the second chemical sensor outputs. If a leak occurs in a chamber of the shroud the first chemical sensor output may have a greater increase and/or rate of increase than the second chemical sensor output. If a leak occurs in the ambient environment surrounding the shroud the second chemical sensor output will have a greater increase and/or rate of increase than the first chemical sensor output.

The information unit can be an alarm and/or other information reporting means that can inform of hazardous leaks or other information collected by the chemical and/or physical sensors and the monitoring circuit. The information unit can be a local information unit in proximity to the shroud and/or a remote information unit in communication with a transmitter and/or the monitoring circuit. The information unit can emit a signal showing the status of the sensors to various output devices. When the information unit is remote, the monitoring circuit emits an output signal to a transmitter which emits a status signal to a receiver in communication with the remote information unit. The remote information unit can receive signals from more than one transmitter, thereby monitoring more than one vessel. Shippers, operators, and customers can have access to the local and/or remote information units through various output devices, such as computers, cell phones, pagers, and personal digital assistants, to receive information such as the vessel location and vessel integrity associated with their shipments.

In another embodiment of this invention, one sensor is sufficient to detect the leak in the area near the vessel valves if the sensor can be adequately compensated for temperature changes, environmental effects, and interferences.

In another embodiment of this invention, at least one physical sensor is in communication with the monitoring circuit. The physical sensor can monitor temperature, pressure, movement and/or sounds around the vessel, and/or determine the position of the vessel by means such as satellite positioning technology. The physical sensor is in communication with the monitoring circuit and therefore can also be in communication with the remote information unit and provide information to interested parties.

DETAILED DESCRIPTION OF THE PRESENTLY PREFERRED EMBODIMENTS

Figure 1:
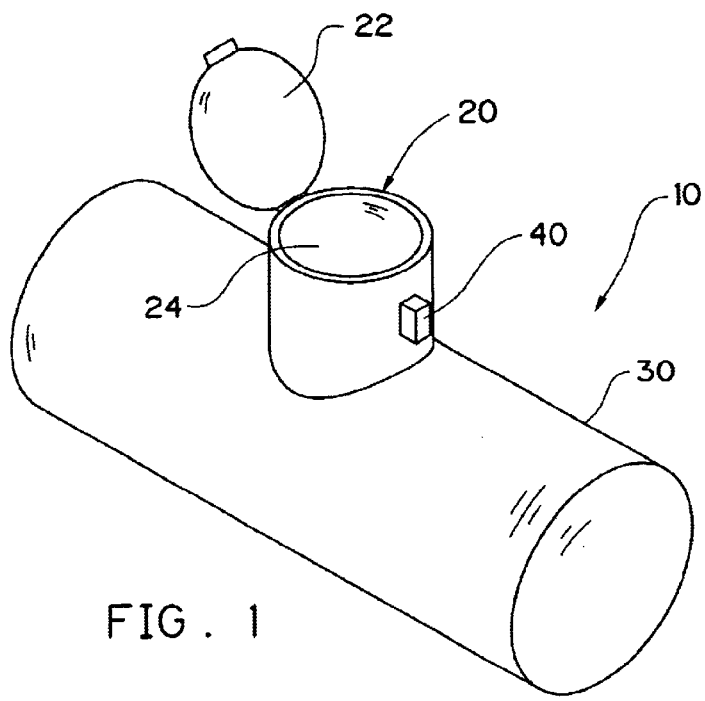
FIG. 1 shows a perspective view of a general representation of a high-pressure vessel, according to one embodiment of this invention.

The present invention is related to a vessel monitoring system having a leak detection apparatus for detecting leaks from a vessel. This invention is of particular use with high-pressure vessels, or other shipping vessels, associated with railroad tankcars, semi-tractor trailer tankcars, ships, cargo containers, and other tankcars used to store and transport fluids and gases. FIG. 1 shows a general representation of vessel 10. Vessel 10 includes shroud 20 with lid 22 enclosing first chamber 24. Shroud 20 is attached to tank 30, preferably but not necessarily with a hermetic seal, for providing a cover for the access means, such as a valve or manway, to tank 30. One skilled in the art will appreciate the various embodiments possible for shroud 20, including large access ways and small, simple valve covers. At least one device forming communication between first chamber 24 and second chamber 32 is contained in first chamber 24. The device can be a valve, a combination of valves, a feed-through, a portal, or other access means.

Figure 2:
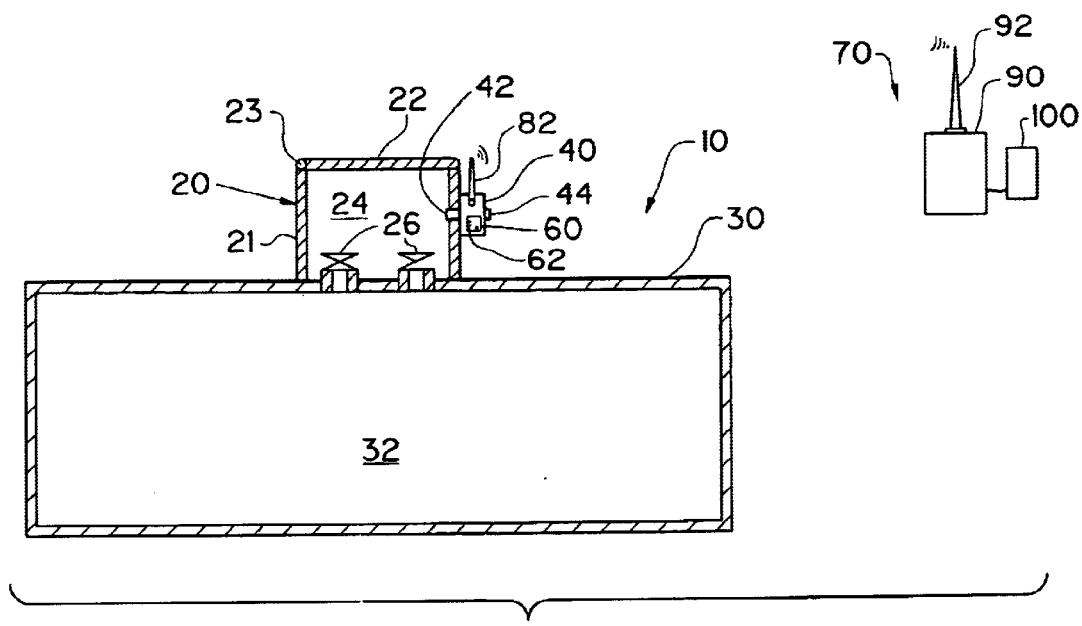
FIG. 2 is a partial cross-sectional view and partial diagrammatic view of a high-pressure vessel, according to one embodiment of this invention.

In FIG. 2, the device is shown as valve 26, which can be a gate valve, a check valve, a pressure relief valve, and/or another type known in the art, for filling, emptying, and/or emergency discharging tank 30 with a substance (not shown) for storage and/or transport. Although devices other than valves can be used to form communication between first chamber 24 and second chamber 32, this invention will be described below as having valve 26. FIG. 2 shows two valves 26 housed by shroud 20 or enclosed within first chamber 24, and in communication with second chamber 32 of tank 30.

A substance is contained in second chamber 32 for storage and/or transporting by train, truck, boat, or other transport device. Tank 30 is preferably hermetically sealed having one or more valves 26 as the only access of second chamber 32 for filling, emptying, and/or emergency discharging second chamber 32 with a substance. As used throughout this specification and/or in the claims, the term substance refers to any material suitable for storage and/or transport using high-pressure vessel 10. Typically the substance contained in second chamber 32 is in a liquid and/or gaseous state. As used throughout this specification and/or in the claims, the term high-pressure refers to the pressure within second chamber 32, typically higher than the surrounding atmospheric pressure due to an amount of liquid and/or gas for storage and/or transport within second chamber 32.

Shroud 20 is useful as a protective structural and/or environmental covering for valve 26. Shroud 20 prevents accidental contact with valve 26 and/or shelters valve 26 from environmental elements that could damage a seal of valve 26, resulting in leakage from second chamber 32. Lid 22 can be connected to shroud wall 21 by hinge 23, allowing access to first chamber 24 and thus valve 26. In one embodiment of this invention, shroud 20 comprises a manway attached to vessel 10, allowing access to valve 26. Shroud 20 is preferably rigid and fixed to vessel 10 by a permanent mechanical connection, such as welding.

Valve 26 preferably forms a leak proof seal between second chamber 32 and first chamber 24. However, aging valves and stress during use can cause leaks in a valve seal or other valve component. Leaks can be dangerous to persons working in proximity to vessel 10, particularly those who open lid 22 to remove the substance from second chamber 32. To minimize and/or avoid exposure to leaked substance, a leak detection apparatus in communication with an information unit, which can include an alarm and/or other warning means, can be used to alert to the presence of a leak.

Figure 3:
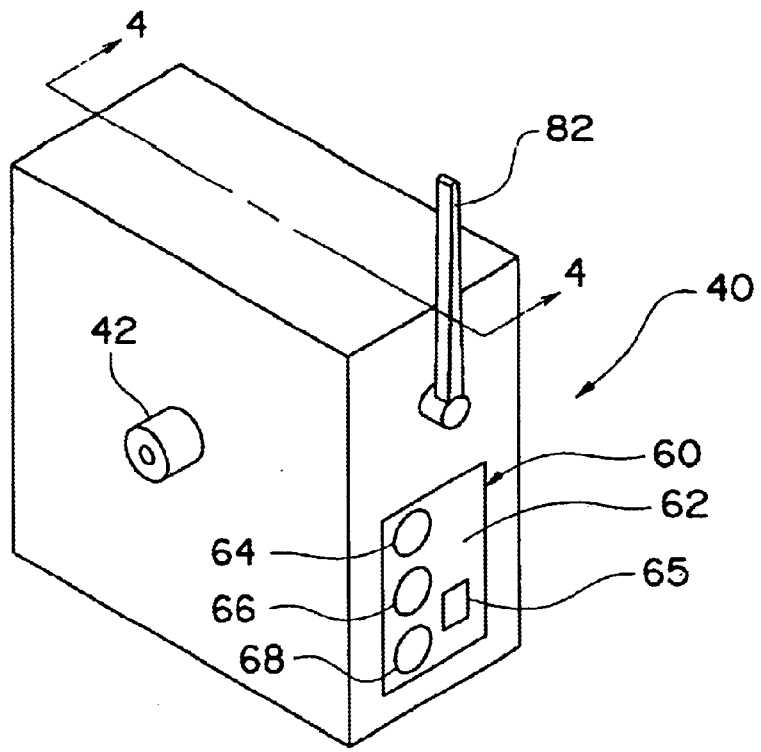
FIG. 3 is a perspective view of a leak detection apparatus, according to one embodiment of this invention.

In one embodiment of this invention, as shown in FIGS. 2 and 3, leak detection apparatus 40 comprises first chemical sensor 42 in communication with first chamber 24 of shroud 20. First chemical sensor 42 can be located within first chamber 24 or outside of first chamber 24 and connected by additional plumbing. First chemical sensor 42 can detect the presence and preferably the concentration of a predetermined substance, such as chlorine gas. Chemical sensors useful in this invention are preferably sensitive to low exposures of a substance. For example, the Occupational Safety and Health Administration (OSHA) permissible exposure limit (PEL) for chlorine gas is 1.0 parts per million and The National Institute for Occupational Safety and Health (NIOSH) has established a recommended exposure limit (REL) for chlorine of 0.5 parts per million. Chemical sensors of this invention would preferably detect chlorine gas, for example at these low levels.

Figure 4:
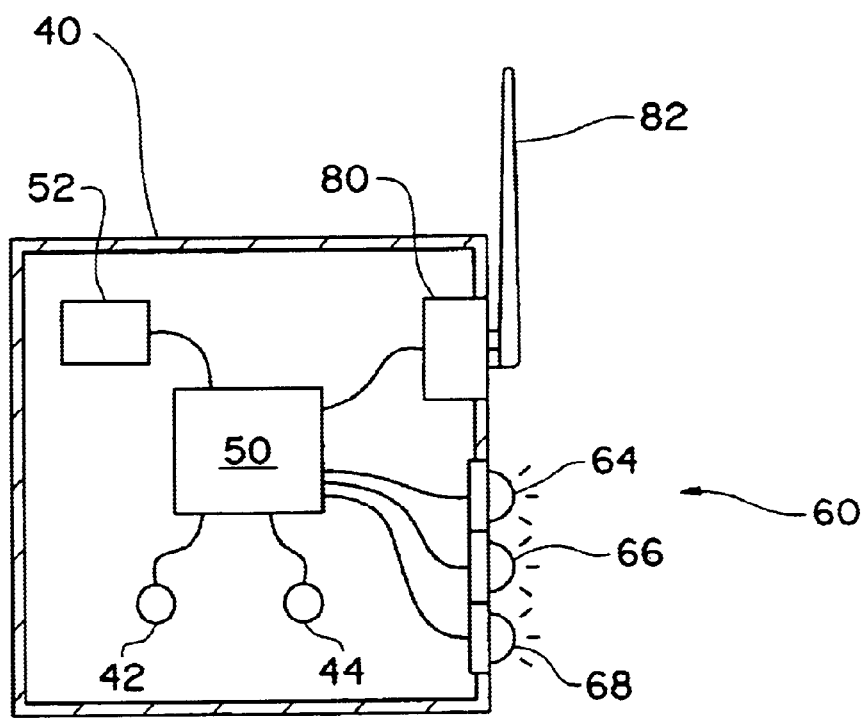
FIG. 4 is a cross-sectional view, taken along line 4—4, of a leak detection apparatus, according to the embodiment of this invention as shown in FIG. 3.

In one embodiment of this invention, second chemical sensor 44 can be positioned in communication with an ambient environment surrounding shroud 20. As shown in FIG. 4, monitoring circuit 50, located within leak detection apparatus 40, can be in communication with first chemical sensor 42 and second chemical sensor 44. Upon exposure to the predetermined substance, chemical sensors 42 and 44 can generate a chemical sensor output. Preferably, the chemical sensor outputs can be in proportion to the concentration of the substance being detected, for example, a higher concentration of a substance can result in a higher chemical sensor output.

Monitoring circuit 50 monitors a first chemical sensor output and a second chemical sensor output. This monitoring of the first and second chemical outputs can allow the leak detection apparatus of this invention to operate effectively, even while the vessel is in motion. Monitoring circuit 50 can be in communication with an information unit, designated by reference numbers 60 and/or 70, of leak detection apparatus 40. FIG. 2 shows information unit 60 as a local information unit and information unit 70 as a remote information unit. The local information unit 60 can include various alarm configurations that emit signals to warn a person in the immediate surrounding of vessel 10, such as during loading and unloading of vessel 10, of a leak by using, for example, lights, light-emitting diodes, and/or audio signals. Remote information unit 70 can receive data concerning shipment of vessel 10 using wireless technology and can be used to warn of a dangerous condition via central processing unit 100 which emits a signal to various output devices such as a monitor, cell phone, pager, personal digital assistant, and/or additional central processing units. It will be apparent to one skilled in the art in view of the teachings of this specification that the leak detection apparatus of this invention can include both a local information unit and a remote information unit or, in the alternative, either a local information unit or a remote information unit, and that both information units can encompass various alarm configurations known in the art and/or be in communication with various output devices.

Local information unit 60 and remote information unit 70 can emit a signal in response to an increase of the first chemical sensor output and/or the second chemical sensor output. The information units can also emit signals indicating no increase in the outputs of the chemical sensors. First chemical sensor 42 can be positioned in communication with first chamber 24, separated from second chemical sensor 44 which is in communication with the ambient environment surrounding shroud 20. Monitoring circuit 50 can monitor the first chemical sensor output and second chemical sensor output and can determine whether the increase in output of first chemical sensor 42 and/or second chemical sensor 44 results from a leak from second chamber 32 into first chamber 24, such as from valve 26, or whether the increase in output is due to external factors in the ambient environment such as pollution, another leaking vessel, or other cause.

Lid 22 and/or shroud 20 preferably, but not necessarily, form an air tight seal. Lid 22 can act as a barrier to slow or prevent the diffusion of the detectable substance from first chamber 24 to the ambient environment outside shroud 20 and, likewise, the reverse. The barrier created by lid 22 can result in a substance concentration difference between first chamber 24 and the surrounding ambient environment. Monitoring circuit 50 can detect this concentration difference by the first and second chemical sensor outputs and determine whether there is a leak from second chamber 32 into first chamber 24.

When a leak occurs from second chamber 32 into first chamber 24, for example due to a faulty valve 26, the concentration of the leaking substance can build in first chamber 24 and expose first chemical sensor 42 to the leaked substance. An airtight seal between lid 22 and shroud 20 should contain the leaking gas within first chamber 24. Therefore the first chemical sensor output of first chemical sensor 42 should increase but the second chemical sensor output of second chemical sensor 44 should not increase or increase at a slower rate and/or a lesser magnitude. Monitoring circuit 50 can compare the first and the second chemical sensor outputs and local information unit 60 and/or remote information unit 70 can emit a first signal dependant upon an increase in the first sensor output and little or no increase in the second chemical sensor output, thereby alerting that there is, or at least has been, a leak from valve 26. Appropriate precautions can then be taken.

When second chemical sensor 44, in communication with the ambient environment surrounding shroud 20, is exposed to an increase in the monitorable substance and the second chemical sensor output increases and the first chemical sensor output increases relatively less or not at all, monitoring circuit 50 can emit an output signal to local information unit 60 and/or remote information unit 70 to emit a second signal identifying that the substance originates from a source external of shroud 20. Possible causes of the ambient substance increase include moving vessel 10 through a high-pollution area and/or a second vessel leaking nearby.

If both first and second chemical sensor outputs increase by the same amount then the information unit can emit a third signal or, alternatively, emit the first signal in the same manner as if only the first chemical sensor output had increased. The first signal would be appropriate in this situation because the necessary precaution when both sensors increase would resemble the precautions taken upon a leak from second chamber 32 into first chamber 24.

In one embodiment of this invention, local information unit 60 and/or remote information unit 70 can periodically or continually emit a fourth signal dependant upon no significant increase of either the first chemical sensor output or the second chemical sensor output, thereby indicating that no dangerous conditions is detected. The fourth signal can also be emitted upon request by someone with remote access to the leak detection system who desires information obtained by the sensors and monitoring unit 50.

Lid 22 and/or shroud 20 can lose their airtight seal with respect to each other, due to age, use under harsh conditions, improper use, during designated ventilation, or other causes. When lid 22 no longer forms an airtight seal there can be less of a barrier between first chemical sensor 42 and second chemical sensor 44 to differentiate their respective substance exposures, and therefore there can be a more similar increase in both the first sensor output and the second sensor output, which can cause more ambiguous signals. In another embodiment of this invention, monitoring circuit 50 monitors a first rate of increase of the first chemical sensor output and a second rate of increase of the second chemical sensor output. Monitoring circuit 50 can determine a difference between the first rate of increase of the first chemical sensor output and the second rate of increase of the second chemical sensor output, and the signal emitted from information unit 60 and/or remote information unit 70 can be a function of the difference between the first rate of increase and the second rate of increase.

If the first rate of increase is greater than the second rate of increase, then a leak can be from second chamber 32 into first chamber 24 and subsequently entering the ambient environment through leaks in lid 22 and/or shroud 20. Upon detecting a greater first rate of increase, local information unit 60 and/or remote information unit 70 emits a first signal. If the second rate of increase is greater than the first increase then the substance is present first in the ambient environment and then entering first chamber 24, and monitoring circuit 50 can signal local information unit 60 and/or remote information unit 70 to emit a second signal. If the first rate of increase is substantially equal to the second rate of increase then local information unit 60 and/or remote information unit 70 can emit either a third signal or the first signal. Also, as above, local information unit 60 and/or remote information unit 70 can emit a fourth signal periodically or continually to indicate no substance detected.

FIG. 2 shows information unit 60 as a local information unit. Local information unit 60 is located on or in proximity to shroud 20 of leak detection apparatus 40. Local information unit 60 preferably has a plurality of indicators, each corresponding to a different warning level determined by the first signal, the second signal, the third signal, and/or the fourth signal emitted from monitoring circuit 50. FIGS. 2, 3, and 4 show local information unit 60 as a local alarm having indicator panel 62. Indicator panel 62 has first indicator light 64, second indicator light 66, and third indicator light 68, each can indicate one of three different conditions: 1) all clear/no dangerous conditions detected; 2) leak detected from second chamber 32 into first chamber 24; or 3) detected substance originated in ambient environment surrounding shroud 20. Local information unit 60 can use visual and/or audio indicators to alert of dangerous conditions. Persons skilled in the art following the teachings of this invention will appreciate that various local information unit configurations and/or alarm configurations known in the art can be used in combination with this invention. Reset button 65 can be used to reset first chemical sensor 42, second chemical sensors 44, and/or local information unit 60.

In one embodiment of this invention, remote information unit 70 can be in communication with monitoring circuit 50 by using wireless technology. In one embodiment of this invention, leak detection apparatus 40 has transmitter 80 in communication with monitoring circuit 50. Transmitter 80 receives an output signal from monitoring circuit 50 and emits a status signal to receiver 90 in communication with remote information unit 70. The status signal is the wireless transmission of the output signal, or at least the transmission of the same information/status as indicated by the output signal. In one embodiment of this invention, remote information unit 70 includes an alarm which has a plurality of indicators that indicate the leak status of vessel 10. Alternatively, remote information unit 70 could include an output device through which information relating to vessel 10 is received. FIG. 1 shows antenna 72 in communication with transmitter 80 of leak detection apparatus 40 for emitting the status signal, which can include various forms, such as radio signals, analog signals, digital signals, and/or wireless signals. Remote information unit 70 can have receiver 90 and antenna 92 in communication with transmitter 80 for receiving the status signal. The output signal and the status signal can depend upon the increase or rate of increase of one of the first chemical sensor output and/or the second chemical sensor output.

In another embodiment of this invention, remote information unit 70 can include a central processing unit 100. Remote information unit 70 can receive a second status signal from more than one transmitter in connection with more than one vessel. As shown in FIG. 2, remote information unit 70 can be connected to central processing unit 100 to monitor and control more than one leak detection apparatus 40. Central processing unit 100 can be connected to the Internet or output devices such as monitors, cell phones, pagers, personal digital assistants, and/or other electronic or digital communication means or access means to allow shippers, operators, customers, or others interested in vessel 10 to monitor the conditions and/or location of vessel 10.

In one embodiment of this invention, leak detection apparatus 40 can have self-contained power source 52, which can be a power source such as a battery or a solar panel. Preferably power source 52 has a long lifespan and requires infrequent replacement or recharging. To maximize the life of power source 52 the components, such as monitoring circuit 50, first and second chemical sensors, and/or transmitter 80, are low power components requiring relatively small amounts of energy, suitably about 100 milliwatts or less.

Additional sensors can also be added to monitoring circuit 50 in addition to first and second chemical sensors 42, 44. In one embodiment of this invention at least one physical sensor can be positioned in first chamber 24 and/or the ambient environment surrounding shroud 20 and in communication with monitoring circuit 50. The physical sensor can include a temperature sensor, pressure sensor, proximity sensor, video sensor such as a CCD camera, audio sensors, and/or positioning sensor such as global positioning satellite technology location devices. When the physical sensor detects a monitorable characteristic, such as a proximity sensor detecting a person approaching vessel 10, monitoring circuit 50 can signal local information unit 60 and/or remote information unit 70. A proximity sensor can be used to detect unwanted tampering of vessel 10, for example, by terrorists. Leak detection apparatus 40 can also use positioning sensors, such as global positioning satellite technology or other similar position determination technology, to emit signals for determining the location of vessel 10. Shippers, operators, customers, or others interested in vessel 10 can be given access to central processing unit 100 through various output devices discussed above to determine the location and condition of a shipment vessel, while vessel 10 is in motion and/or stationary.

In another embodiment of this invention, vessel 10 can have only one chemical sensor in communication with first chamber 24 of shroud 20. Upon an increase in the chemical sensor output above a predetermined value, monitoring circuit 50, which can be in communication with the chemical sensor, can cause information unit 60 to signal a warning. As above when using two chemical sensors, the information unit can be local information unit 60 and/or remote information unit 70. Monitoring circuit 50 can also be used to compare the chemical sensor output to more than one incremental predetermined value and local information unit 60 and/or remote information unit 70 can emit a signal dependant on the value increment detected inside shroud 20, thereby indicating an exposure risk.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

I claim:

1. An apparatus for detection of a leak from a tankcar vessel and for reducing interference or false alarms, the apparatus comprising:
    a rigid shroud fixed to the tankcar vessel, the shroud having a first chamber, the first chamber housing a device forming communication with a second chamber of the tankcar vessel, the second chamber containing a substance;
    a first chemical sensor in communication with the first chamber of the shroud;
    a second chemical sensor positioned in communication with an ambient environment surrounding the shroud;
    a monitoring circuit in communication with the first chemical sensor and the second chemical sensor, wherein the monitoring circuit monitors and compares a chemical sensor output of each of the first and second chemical sensors to reduce at least one of interference and false alarms; and
    an information unit in communication with the monitoring circuit, the information unit emitting a signal in response to an output signal emitted from the monitoring circuit.

2. The apparatus of claim 1, wherein the monitoring circuit monitors a first chemical sensor output and a second chemical sensor output, and the information unit emits a signal in response to the output signal when the output signal indicates an increase of at least one of the first chemical sensor output and the second chemical sensor output.

3. The apparatus of claim 1, wherein the monitoring circuit determines a difference between a first rate of increase of the first chemical sensor output and a second rate of increase of the second chemical sensor output, and the information unit emits a signal that is a function of the difference between the first rate of increase and the second rate of increase.

4. The apparatus of claim 1, wherein the information unit comprises at least one of a local information unit positioned in proximity to the shroud of the vessel and a remote information unit in communication with the monitoring circuit.

5. The apparatus of claim 4, further comprising a transmitter in communication with the monitoring circuit, the transmitter receiving the output signal from the monitoring circuit and emitting a status signal to a receiver in communication with the remote information unit.

6. The apparatus of claim 5, wherein the remote information unit comprises a central processing unit in communication with the receiver.

7. The apparatus of claim 6, wherein the remote information unit emits a signal to an output device.

8. The apparatus of claim 5, wherein the second status signal is at least one of a radio signal, an analog signal, a digital signal, and a wireless signal.

9. The apparatus of claim 6, wherein the central processing unit receives a second signal from each of at least one second transmitter in connection with at least one second vessel.

10. The apparatus of claim 1, wherein the information unit comprises a plurality of indicators each corresponding to a different warning level.

11. The apparatus of claim 1, wherein the monitoring circuit has a power rating of less than about 100 milliwatts.

12. The apparatus of claim 1, wherein the first and second chemical sensors have a power rating of less than about 100 milliwatts.

13. The apparatus of claim 5, wherein the transmitter has a power rating of less than about 100 milliwatts.

14. The apparatus of claim 1, further comprising a physical sensor in communication with the monitoring circuit.

15. The apparatus of claim 14, wherein the physical sensor is selected from the group consisting of temperature sensors, wireless sensors, pressure sensors, proximity sensors, video sensors, audio sensors, and positioning sensors.

16. The apparatus of claim 1, wherein the shroud comprises a manway attached to the vessel.

17. An apparatus for detection of a leak from a tankcar vessel and for reducing interference or false alarms, the apparatus comprising;
 a rigid shroud fixed to the tankcar vessel, the shroud having a first chamber, the first chamber housing a device forming communication with a second chamber of the tankcar vessel, the second chamber containing a substance;
 a first chemical sensor in communication with the first chamber of a shroud;
 a second chemical sensor positioned in communication with an ambient environment surrounding the shroud;
 a monitoring circuit in communication with the first chemical sensor and the second chemical sensor, wherein the monitoring circuit monitors and compares a chemical sensor output of each of the first and second chemical sensors to reduce at least one of interference and false alarms; and
 a remote information unit in communication with the monitoring circuit, the remote information unit including a central processing unit;
 wherein the central processing unit is accessible by at least one of an Internet connection and an output device.

18. The apparatus of claim 17, wherein the information unit further comprises a local information unit positioned in proximity to the shroud of the vessel and in communication with the monitoring circuit.

19. The apparatus of claim 17, further comprising a transmitter in communication with the monitoring circuit, the monitoring circuit emitting an output signal to the transmitter and the transmitter emitting a status signal to a receiver in communication with the remote information unit.

20. The apparatus of claim 19, wherein the status signal is at least one of a radio signal, an analog signal, a digital signal, and a wireless signal.

21. The apparatus of claim 19, wherein the remote information unit receives a second status signal from each of at least one second transmitter in connection with at least one second vessel.

22. The apparatus of claim 17, wherein the remote information unit emits a signal to an output device.

23. The apparatus of claim 22, wherein the information unit comprises a plurality of indicators each corresponding to a different warning level.

24. The apparatus of claim 17, wherein the monitoring circuit has a power rating of less than about 100 milliwatts.

25. The apparatus of claim 17, further comprising a physical sensor in communication with the monitoring circuit.

26. The apparatus of claim 25, wherein the physical sensor is selected from the group consisting of a temperature sensor, a pressure sensor, a proximity sensor, a video sensor, an audio sensor, and a positioning sensor.

27. The apparatus of claim 17, wherein the shroud comprises a manway movably attached with respect to the vessel.

28. A method for detecting a leak from a tankcar vessel and for reducing interference or false alarms, the method comprising,
 exposing a first chemical sensor to a first chamber of a rigid shroud fixed to the tankcar vessel, the shroud housing a device forming communication with a second chamber of the tankcar vessel, the second chamber containing a substance;
 exposing a second chemical sensor to an ambient environment outside the shroud of the vessel;
 monitoring a first chemical sensor output of the first chemical sensor with a monitoring circuit;
 monitoring a second chemical sensor output of the second chemical with the monitoring circuit;
 detecting at least one of a first increase of the first chemical sensor output and a second increase of the second chemical sensor output;
 comparing the first chemical sensor output and the second chemical sensor output to reduce at least one of interference and false alarms; and
 signaling an information unit in communication with the monitoring circuit.

29. The method of claim 28, further comprising:
 determining a difference between a first rate of the first increase and a second rate of the second increase;
 wherein the signal is dependant on the difference between the first rate and the second rate.

30. The method of claim 29, wherein the information unit comprises at least one of a local information unit positioned in proximity to the shroud of the vessel and a remote information unit in wireless communication with the monitoring circuit.

31. The method of claim 28, further comprising:
 exposing a physical sensor to one of the first chamber and the ambient environment; and
 monitoring a physical sensor output of the physical sensor with the monitoring circuit.

* * * * *